Jan. 6, 1942.  E. KELLY  2,268,709

PROCESS OF MAKING SOLES

Filed Feb. 3, 1940  2 Sheets-Sheet 1

Inventor:
Emmet Kelly.
By Kenway & Witter
Attorneys

Jan. 6, 1942. E. KELLY 2,268,709
PROCESS OF MAKING SOLES
Filed Feb. 3, 1940 2 Sheets-Sheet 2
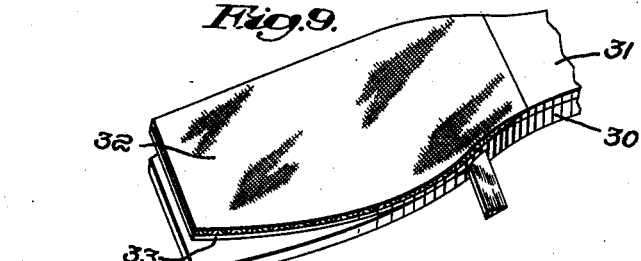
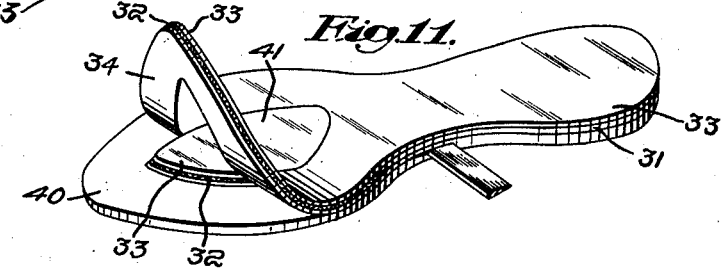
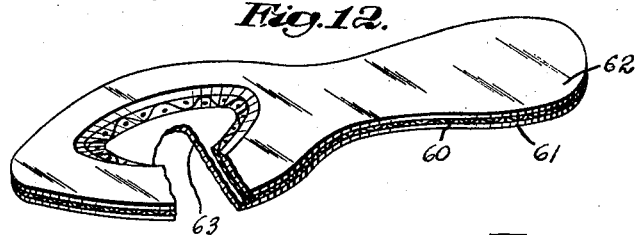
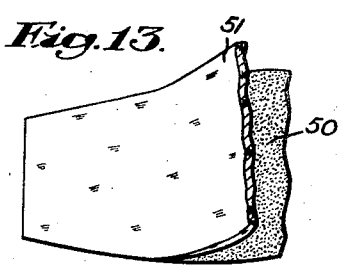
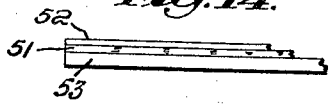
Inventor:
Emmet Kelly.
by Kenway & Witter
Attorneys Patented Jan. 6, 1942

2,268,709

UNITED STATES PATENT OFFICE 2,268,709

PROCESS OF MAKING SOLES

Emmet Kelly, Boston, Mass.

Application February 3, 1940, Serial No. 317,155

5 Claims. (Cl. 12—146)

This invention consists in improvements in the manufacture of insole-outsole units for use in the well known Sbicca Del-Mac process of shoemaking, disclosed, for example, in U. S. Pat. No. 1,902,725, granted on an application of Frank Sbicca.

In one aspect the invention consists in a process characterized by the step of cementing to the flesh surface of an outsole blank a lamination which may be termed a reinforcing ply and which may comprise such textile fabric as duck, or it may comprise paper, fibre or cushion material, such as felt or cork composition, and then splitting in a straight splitting operation to remove a relatively thin, two-ply layer, that is, to remove the added ply with a thin underlying ply of leather from the body of the outsole blank.

The composite two-ply split thus produced is then reversed and cemented to the opposite outsole of the pair, that is, the composite split removed from the right blank is reversed and cemented to the split surface of the left blank and vice versa. The three-ply composite blanks formed in this manner are now rounded and then split, conveniently in a matrix splitting machine, to form the well known combination of outsole and insole, the outsole with elevated island or land in its forepart and the three-ply insole having a correspondingly shaped opening in its forepart or an area therein which is reduced to substantially a single ply thickness, and conforming in the shape of the island left on the outsole portion.

A decided savings results from the practice of this process owing partly to the fact that a gain in thickness of at least one and one-half irons is made in cementing the two plies to the block sole. For example, a pair of 7½ iron soles may cost 24¢ and a similar pair of 9 iron soles 30¢ to 31¢. The cost of fabric, cement and labor of treating a 7½ iron pair of soles as above outlined will be less than 2¢ per pair, thus leaving a margin of 4¢ or 5¢ per pair saved by the novel process of my invention.

Moreover, an insole is produced which is exceptionally tough, light and strong and well adapted to withstand the strains of the lasting operation without deformation, thus improving the accuracy of the shoemaking and the quality of the shoe in which the novel insole is used.

Instead of using a full length ply of insole material for the intermediate ply it is contemplated that a composite blank including a fabric or paper composition forepart and a fibre or stiff paper shank may be employed. This saves an amount of material corresponding to the rear half of the fabric or paper composition blank and binds the fibre shank piece into the assembled structure firmly and permanently.

If a cushion sole is desired the employment of felt or cork composition in the intermediate layer provides a cushion sole of superior wearing quality by a process which may be carried out advantageously from a commercial standpoint.

The invention includes within its scope the novel supplementary insoles and outsoles herein shown as produced by the process of my invention. The features of these, together with the characteristics of the process, will be best understood and appreciated from the following description of the process as carried out in the production of several preferred embodiments of the invention illustrated in the accompanying drawings in which—

Figs. 7, 8 and 9 are views corresponding to Figs. 1, 2 and 3 illustrating the employment of a composite ply of flexible forepart and stiff shank material;

Fig. 10 is a view in side elevation of the composite split, shown as being removed from the composite blank in Fig. 9;

Fig. 11 is a view in perspective illustrating the matrix splitting step on a composite blank which includes the two-ply split of Fig. 10;

Fig. 12 is a view in perspective of an insole of modified construction which may be produced by the process of my invention;

Fig. 13 is a fragmentary plan view; and

Fig. 14 is a fragmentary view in elevation illustrating the use of a cushion ply in an alternative construction of embodying the invention.

Figure 1:
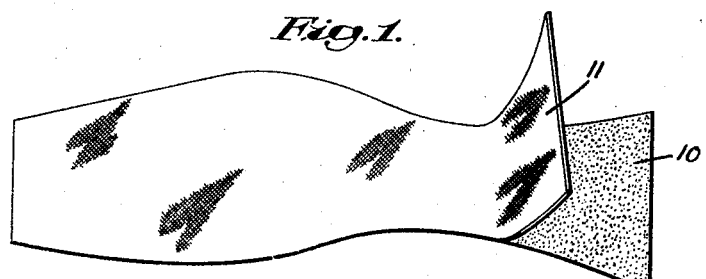
Fig. 1 is a plan view showing a reinforcing layer partially applied to a block sole blank.
Figure 2:
Fig. 2 is a corresponding view in elevation.
Figure 3:
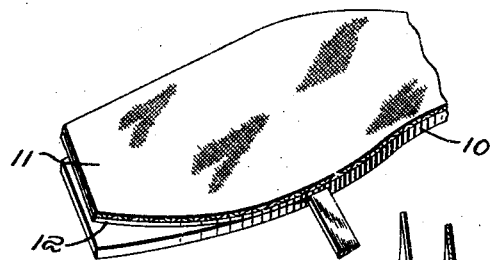
Fig. 3 is a view in perspective illustrating the flat splitting step on the composite blank of Fig. 2.
Figure 4:
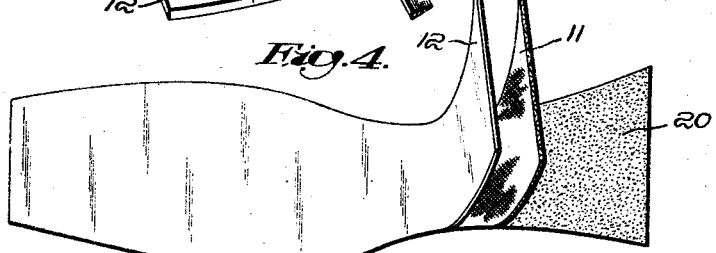
Fig. 4 is a plan view showing the split reversed and partially cemented to the other sole blank of the pair.

In preparing a pair of insole-outsole units, it is convenient to employ blocked sole blanks, and accordingly a pair of right and left blocked sole blanks 10 and 20 of suitable thickness are first selected and to the flesh surface of each blank is cemented in continuous face-to-face contact a ply or layer 11. This layer 11 may be textile reinforcing material, such as duck, or it may be formed from a sheet of insole material of any desired composition having suitable characteristics of flexibility and toughness. The composite blank shown in Fig. 1 is now split on a plane below the plane of the cement which bounds the layer 11 to the sole blank. In this operation therefore a thin underlying layer or ply 12 of outsole material is removed together with the reinforcing ply 11. The two-ply blank thus removed as suggested in Fig. 3 is now reversed and cemented to the other block sole blank 20 of the pair, which meanwhile has been similarly split. In this step the reinforcing layer which was uppermost when removed from the blank 10 is now located next to the blank 20 and is covered by a leather ply 12 which was removed from the blank 10.

In this step of the process a pair of right and left block sole blanks are produced which consist of three plies, viz. the thick body of the blank 10 or 20, a thin intermediate reinforcing ply 11 of textile material and a thin split leather covering ply 12. The addition of the reinforcing ply 11 and the two layers of cement substantially increases the thickness of the composite blocked sole blank as compared with the original solid block sole blanks. For example, the original solid block sole blanks may be 7½ irons in thickness while the composite blocked sole blanks may be 9 irons in thickness.

Figure 5:
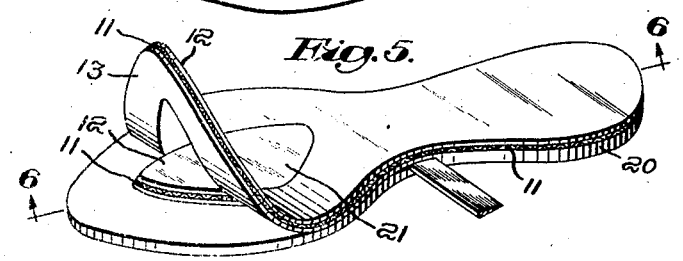
Fig. 5 is a view in perspective illustrating the splitting operation on the rounded composite blank.
Figure 6:
Fig. 6 is a corresponding view in side elevation.

Having prepared the composite blocked sole blanks as above outlined they may now be rounded to the desired shape. Then the rounded blank may be split in such a manner as to produce an outsole having the island or land 21 in its forepart and a corresponding opening in the forepart of the insole which comprises removed plies. Preferably, and in order to take full advantage of the invention, this separation of the stock takes place along a plane extending 1 or 2 irons below the cemented surface so that another ply of leather 13 is removed from the body of the sole. The exact location of the splitting plane is of secondary importance and may be varied in accordance with the requirement of the work. Ordinarily, however, the insole removed will, as shown in Fig. 5, comprise in the margin of its forepart and in the rear of the ball line three distinct plies, viz. an outer leather ply 12 which came from the blank 10, the intermediate textile reinforcing ply 11, and a leather ply 13 split from the blank 20. The insole is therefore faced with leather on both sides, the reinforcing layer being completely enclosed by the leather facing plies. Correspondingly the land 21 is built up of three plies, the lower or inner ply being integral with the body of the outsole 20, the second being the reinforcing ply 11 and the third being the leather ply 12 coming originally from the blank 10.

In making a shoe with the insole-outsole unit thus produced, the three-ply insole is usually trimmed about its margin, attached to the last bottom and the overlasted margin of the upper is then secured thereto by cement or otherwise. Subsequently the outsole is secured in the shoe bottom with its land or island 21 filling the opening which has been provided in the insole. At this point attention is again called to the effect of the ply 11 in reinforcing the insole against the strains to which it is subjected in the lasting operation.

If it is desired to embody a stiff shank piece in the insole, my invention may be carried out as suggested in Figs. 7-11, that is to say, instead of employing a homogeneous reinforcing layer, I propose to cement to the block sole blank 30 a composite ply comprising a rear portion of stiff fibre or paper board and a forepart of textile reinforcing material or other suitable insole composition. The rear portion 31 of this ply is beveled at its forward edge and overlapped to some extent by the flexible portion 32 of the ply. The portions 31 and 32 may be handled as a single ply and cemented in a continuous face-to-face contact with the sole blank 30. The composite blank thus formed is then split on a plane slightly below that of the cement and a thin continuous ply of leather 33 removed from the body of the blank 30 thus forming a two-ply composite blank as shown in Fig. 10. This blank may now be reversed and cemented to the other blocked sole blank of the pair and the composite blank subsequently rounded and matrix split as suggested in Fig. 11. In this splitting operation an insole is removed which comprises a thin leather ply 34 coming from the sole blank 40, a composite intermediate layer comprising flexible material 32 of the forepart, and the stiff shank material 31 of the rear part, and finally a covering layer of leather 33 coming from the blank 30. The outsole, as before, is provided with a land 41 made up of a lower ply formed integral with the body of the outsole 40, a portion of the intermediate ply 32, and a portion of the ply 33 coming from the other sole blank of the pair.

In Fig. 12 is suggested a variation of the splitting step illustrated in Fig. 5 or Fig. 11. Here a ply of flexible material 60 is cemented to a sole blank and a split is made below the line of jointure, thus forming a two-ply blank including a ply 61 removed from the blank. Subsequently the two-ply blank is inverted and cemented to another blank and a second splitting operation is so carried out that an insole with a skeletonized forepart is formed, but the forepart aperture does not go through the ply 61. The result is a three-ply insole including a ply 62 taken from the second blank. There is a thin flexible web portion 63 in the forepart, being a portion of the ply 61. The web 63 gives transverse strength to the insole in the lasting operation and provides a continuous surface beneath the foot of the wearer in the finished shoe.

From the foregoing description it will be apparent that, if desired, a cushion layer of felt or cork composition or the like may be employed in place of the reinforcing layer 11 shown in Fig. 1. In Figs. 13 and 14 such a cushion layer 51 of cork is shown as cemented to the flesh face of a sole blank 50. A two-ply layer is then removed, as suggested in Fig. 3, reversed, and cemented to an outsole blank 53 with the cork ply 51 in direct engagement with the face of the sole blank. From that point on the process proceeds as above described except that the resulting insole is provided with an intermediate cushion layer of cork 51 and the land of the outsole is also provided with a similar ply. In the finished shoe the complementary cork plies are aligned in a cushion extending throughout the whole length of the shoe.

While I have described my invention in connection with the insole-outsole unit commonly used in the Sbicca-Del-Mac process the composite insole produced as herein disclosed has a more general application. For example, the intermediate product shown in Fig. 10 may be used as an insole and comprises a continuous leather ply and a composite ply having a flexible forepart of insole material and a stiff shank part of shank material. This insole may be advantageously employed, without reference to the type of outsole, in any type of shoe where a thin flexible insole is desired.

It will be understood that, while I have referred to cement as a medium for attaching the various plies of the sole, any suitable adhesive medium may be used. Further, in some instances, it may be desirable to leave the uppermost ply unattached throughout the heel seat so that a thin steel plate may be inserted as an anvil for the lasting tacks. As explained already, the plane of matrix splitting may be located wherever desired, and may, in some instances or in some parts of the sole, coincide substantially with the plane of attachment between the plies.

Having thus disclosed my invention and described specific embodiments thereof for purposes of illustration but not in any limiting sense, I claim as new and desire to secure by Letters Patent:

1. A process of preparing complementary insole-outsole units, which includes the steps of cementing stiff shank material to the rear portion of a leather outsole blank, splitting the composite blank thus formed to remove two united plies, reversing said plies and cementing the shank material to another leather outsole blank, and then separating therefrom an insole blank comprising leather plies enclosing the shank material at the same time and providing a landed outsole blank.

2. A process of preparing complementary insole-outsole units, which includes the steps of cementing to right and left outsole blanks a ply comprising flexible forepart and stiff shank material, splitting to remove two united plies, reversing the said plies and cementing them respectively to the left and right outsole blanks of the pair, and then splitting to provide landed outsoles and insoles with shank material enclosed in a pair of plies taken from the outsole blanks.

3. In combination with a shoe, a sole structure comprising an insole having an aperture in the central portion of the forepart, continuous upper and lower plies of homogeneous material in the insole, an intermediate ply of flexible material in the forepart of the insole, an intermediate ply of stiff material in the shank and heel seat portions of the insole, and an outsole having a land filling the aperture in the insole, an upper ply of homogeneous material in the land, an intermediate ply in the land identical with the intermediate ply in the forepart of the insole, and an upper having its overlasted margin disposed between the outsole and insole outside area of the land and the aperture in the insole.

4. A process of making an insole which comprises providing block soles of homogeneous material, cementing to the surface of said block soles composite plies comprising flexible material in the forepart and stiff material in the shank, removing a split from each block sole including the composite ply and a layer from the block sole, cementing the splits thus formed to the block soles with the composite plies against the soles, and removing a second split including a second layer from each block sole.

5. A process of preparing complementary insoles and outsoles, which includes the steps of cementing reinforcing plies to the surfaces of a pair of flat right and left outsole blanks, splitting the composite blanks below and parallel to the cemented bond of the reinforcing plies, thus removing a pair of two-ply splits of substantially uniform thickness, inverting the two-ply splits thus formed, cementing each split to the surface of the blank from which the other split was taken, and then separating from each blank an insole including in its margin a three-ply split comprising an intermediate reinforcing ply and facing plies removed from the outsole blanks.

EMMET KELLY.

CERTIFICATE OF CORRECTION.

Patent No. 2,268,709. January 6, 1942.

EMMET KELLY.

It is hereby certified that error appears in the printed specification of the above numbered patent requiring correction as follows: Page 3, first column, line 34, for "at the same time and providing" read --and at the same time providing--; and second column, line 33, claim 5, after "blanks" insert --thus formed--; line 37, same claim, strike out "thus formed"; and that the said Letters Patent should be read with this correction therein that the same may conform to the record of the case in the Patent Office.

Signed and sealed this 3rd day of March, A. D. 1942.

(Seal)

Henry Van Arsdale,
Acting Commissioner of Patents.